United States Patent [19]

Hjelmstad

[11] Patent Number: 4,925,247

[45] Date of Patent: May 15, 1990

[54] METHOD FOR PARTICLE STABILIZATION BY USE OF CATIONIC POLYMERS

[75] Inventor: Kenneth E. Hjelmstad, Richfield, Minn.

[73] Assignee: The United States of America as represented by the Secretary of the Interior, Washington, D.C.

[21] Appl. No.: 290,556

[22] Filed: Dec. 27, 1988

[51] Int. Cl.$^5$ ..................... C09K 17/00; E21B 43/28
[52] U.S. Cl. ..................... 299/5; 166/305.1; 405/264
[58] Field of Search ............... 299/4, 5; 166/275, 294, 166/305.1; 252/8.551; 405/264

[56] References Cited

U.S. PATENT DOCUMENTS

| | | | |
|---|---|---|---|
| 3,058,729 | 10/1962 | Dahms et al. | 299/5 |
| 3,833,709 | 9/1974 | Chassagne | 299/4 X |
| 4,114,693 | 9/1978 | Foster et al. | 299/4 X |
| 4,185,872 | 1/1980 | Habib, Jr. | 299/4 |
| 4,278,292 | 7/1981 | Yan et al. | 299/5 |
| 4,366,074 | 12/1982 | McLaughlin et al. | 405/264 X |
| 4,498,706 | 2/1985 | Ilardi et al. | 299/5 |
| 4,536,305 | 8/1985 | Borchardt et al. | 166/275 X |
| 4,561,696 | 12/1985 | Graves | 299/4 |
| 4,563,292 | 1/1986 | Borchardt | 405/264 X |

Primary Examiner—George A. Suchfield
Attorney, Agent, or Firm—E. Philip Koltos

[57] ABSTRACT

A method of increasing recovery of mineral and metals during in-situ chemical leaching of earth material by injection of a treating fluid which comprises cationic, organic polymers which are made up of long chain hydrocarbon molecules of very great molecular weight (in excess of 1000 and as great as 1,000,000). Maintaining clays in a flocculated state and preventing the formation of colloidal particles improves permeability during chemical leaching of clay bearing earth materials.

5 Claims, 2 Drawing Sheets

METHOD FOR PARTICLE STABILIZATION BY USE OF CATIONIC POLYMERS

BACKGROUND OF THE INVENTION

1. Field of the Invention

This invention relates in general to a method of fine particle stabilization by negative charge reduction by use of cationic polymers to increase recovery of mineral and metals during chemical leaching of earth material.

2. Description of the Prior Art

It is well known that the disadvantages of the prior art of leaching in clay bearing ores was that there was no successful way to maintain colloid stability to prevent permeability loss. In situ leach mining operations often encounter difficulty maintaining adequate leach solution flow into the ore formation. Swelling and dispersion of clay particles in the formation are often responsible for this permeability loss. In situ leach mining of uranium involves injecting a carbonate-bicarbonate (basic) or sulfate (acidic leach solution (lixiviant)) through injection wells into an ore body where the lixiviant dissolves the uranium from the ore. The lixiviant bearing the complex uranium is then brought to the surface through production wells. Uranium is recovered from the lixiviant by an ion-exchange method.

Plugging of the injection wells is often a problem in in-situ leach mining. It may be caused by improper well construction, invasion by solid particles from drilling fluids or cementing operations, precipitation of chemical salts, bacterial effects, fine particles in the injection fluid, and/or clay swelling and dispersion. Acid or water jet perforation can be used to stimulate wells that exhibit high resistance to injection, but the treatments are not universally applicable and the benefits are generally temporary.

Uranium is most commonly leached from sandstone host rocks, and certain of these formations are water sensitive. Such formations are susceptible to permeability damage by exposure to introduced water that has a chemical composition different from the natural, interstitial water. The introduced water can upset the swelling equilibrium of the clay-water system.

A formation's susceptibility to permeability damage is related to the salinity of the water to which it is exposed and to the type and amount of clay mineral constituents present. Reduction in salinity of interstitial water can cause clay swelling, which may plug pores and reduce permeability. Swelling also causes the clay platelets to break up into finer, negatively charged particles. These negatively charged particles will repel one another and, therefore, disperse through the interstitial fluid until they lodge in constrictions in permeability channels, thereby plugging the channels.

The common swelling-clay minerals are the montmorillonites, mixed-layer clays, and certain types of illite. The clay particles in their natural state are at equilibrium with the saline water that usually occurs in the formations. Swelling occurs when fresh water replaces the saline water in the formation during drilling or leaching activities. In general the amount of swelling increases with a decrease in salinity of the injected water. Therefore, a concentrated brine would cause the least damage and fresh water the most damage. The nature of the clays is also important. Clays in the calcium form do not disperse as easily in low-salinity water as do clays in the sodium form. It is thought that sodium clays dissociate in low-salinity water, creating sodium ions and clay particles with a net negative charge that is great enough to cause the particles to repel one another and thus be dispersed.

The form of clay can be altered by flowing a solution through it. Through cation exchange, a sodium clay may be changed to a calcium clay by passing a concentrated calcium-bearing solution through it. The cation-exchange capacity of the clay minerals is due to broken bonds, substitution within the lattice structure, and replacement of the hydrogen of exposed hydroxyls by the exchangeable cation. It is thought that if at least one-tenth of the dissolved salts in the water are magnesium and calcium, swelling and dispersion of clays will be minimal. The hydrated calcium and magnesium ions seemingly restrict the adsorbed water on the clay to a well-developed configuration of minimal thickness, whereas the sodium ion allows oriented water to grow to very great thicknesses on the clay.

For that reason in situ uranium leach mining operators often use native ground water to prepare the leach solution because it usually contains calcium and magnesium ions. The leach solution, however, may still cause changes in formation water chemistry great enough to cause the clay to swell, and if the clay is in the swelling or dispersing form, any fluid flowing through the formation will result in permeability damage.

Commercial clay stabilizers have been developed to reduce permeability loss due to clay swelling and dispersion. Inorganic clay stabilizers include hydroxyl aluminum and zirconium oxychloride solutions. The higher charge cations of these clay stabilizers will adsorb on the clays more readily than monovalent or divalent cations because the attractive force between the negatively charged clay particles and the stabilizer cations is exponentially related to the charge on these cations. These clay stabilizers have been shown to be effective in reducing permeability losses, but removal of these cations from the clays may occur when and if the wells undergo acid treatment. A series of acid-resistant, organic polymer clay stabilizers have also been developed to prevent permeability losses in water-sensitive formations under a broad range of operating conditions.

These and other problems are well known and a wide variety of methods have been used. For example, U.S. Pat. No. 4,008,134 to Thomsen is based on a combination of leaching the metal-containing raw materials with an organic acid (cation exchange) and a subsequent use of the formed metal cationic complex in a liquid-liquid extraction process. U.S. Pat. No. 4,360,500 to Fly, relates to hydrometallurgy for supplying, separating and assorting solids in liquid suspension by a vertical current.

Also at the time of filing this application, applicant was familiar with the following U.S. patents:
U.S. Pat. No. 4,017,309 to Johnson
U.S. Pat. No. 4,080,419 to Engelman
U.S. Pat. No. 4,342,222 to Alekhim et al
U.S. Pat. No. 4,385,666 to Momadzahanov et al
U.S. Pat. No. 4,410,052 to Momadzahanov et al
U.S. Pat. No. 4,473,115 to Oakes
U.S. Pat. No. 4,606,765 to Ferlay

SUMMARY OF THE INVENTION (1) New and Different Function

The instant invention may be useful to any mining company engaged in metal recovery by solution mining of claybearing ores. It is also useful in preventing respirable dust dispersion when used in water sprays during coal cutting operations and to reduce the likelihood of dust explosions in mines and elsewhere by neutralizing the charge on fine particles containing a negative electrical charge. Cationic polymers are capable of reducing the negative charge on minerals surfaces and therefore may be found to be useful in rock cutting and drilling in the mining industry as they are in the oil well drilling industry. I have found that the use of cationic polymers to stabilize clays and fine particles is an effective means of retaining and/or improving permeability of claybearing earth material when chemical leaching is done to recover metals, minerals or toxic materials. Cationic polymers can suppress negatively charged fine particle dispersion in an aqueous environment and stabilize fine negatively charged particles in an air environment by trapping them by electrokinetic attraction.

A specific embodiment of the instant invention incorporates the use of organic polymers during leaching operations. These polymers, which are made up of long chain hydrocarbon molecules of very great molecular weight (in excess of 1000 and as great as 1,000,000) can prevent clay swelling and breakups and additionally if they are cationic in nature (possessing a positive charge) they are capable of neutralizing the negative electrical charge contained on the surface of fine particles thereby preventing dispersion. There is evidence that these polymers can improve permeability by shrinking clays, as well as preventing swelling. Maintaining clays in a flocculated state and preventing the formation of colloidal particles is a key feature of this approach to improving permeability during chemical leaching of clay bearing earth material. Earth material containing fine particles of many types of minerals may have the contained charge neutralized in this manner.

(2) Objects of the Invention

It is an object of this invention to improve the extraction of leachable minerals from ore.

A further object of this invention is to prevent particle dispersion, swelling of clays and breakups of clay platelets and thus prevent permeability loss during chemical leaching of claybearing earth.

A still further object of this invention is to prevent dust particle dispersion by reduction of zeta potential.

Another object of this invention is to use cationic organic polymers to stabilize earth materials during chemical leaching of metals, minerals or toxic materials from earth materials.

For a further understanding of the invention and further objectives, features and advantages thereof, reference may be had to the following detailed description of the invention. Many other processes in which the present invention will be useful are well within the purview of the skilled artisan and these processes will become more apparent from the following detailed description.

In the Figures

DESCRIPTION OF PREFERRED EMBODIMENTS

Figure 1:
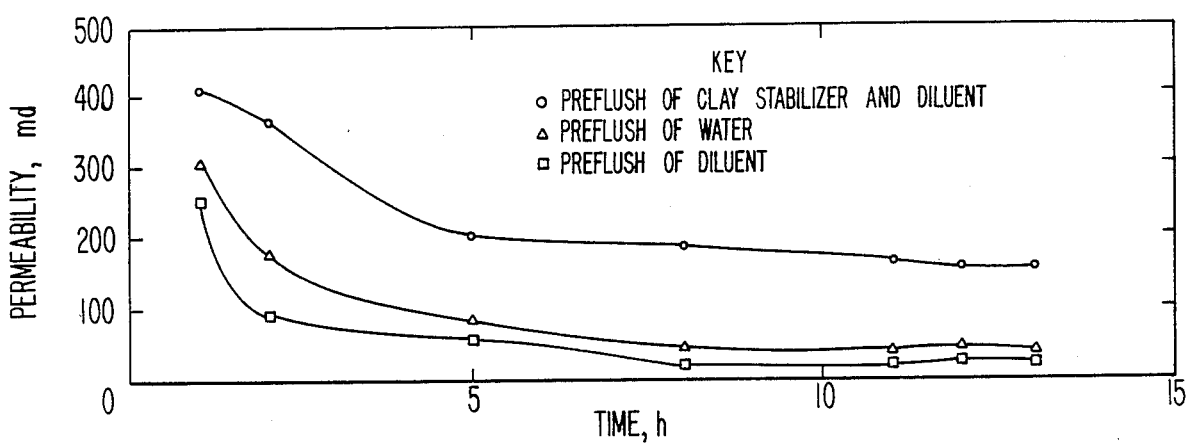
FIG. 1 is a graphical representation of the results of the sodium carbonate-bicarbonate leach tests on Bear Creek uranium.

The instant invention increases the recovery of mineral and metals during chemical leaching of earth material. During chemical leaching of metals or nonmetallic minerals or toxic materials from soils or rocks, the swelling and breakup of indigenous clays, and dispersion of small negatively charged fine particles can cause a loss of permeability which prevents adequate injection of leaching agents into the earth material and therefore prevents effective leaching action. It is known that certain types of clays are particularly susceptible to allowing the buildup of water within their crystal structure. Montmorillonites, illites and mixed layer clays are particularly susceptible to this phenomenon. This swelling action can cause breakup of the clay platelets into fine negatively charged particles which repel each other, disperse and migrate within the permeability channels of the earth material until reaching constrictions where they lodge. The ensuing jam of particles will block the channels and retard fluid movement through the earth material. Research was undertaken at the U.S. Bureau of Mines, Twin Cities Research Center to find ways to overcome the problem of permeability loss during leaching of metals from clay bearing ores and the afore mentioned use of cationic, organic polymers were found to be effective in solving the problem of permeability loss during model chemical leaching of uranium and copper bearing ores in the laboratory.

Permeability is a measure of a porous medium's capacity for transmitting a fluid and hence is a key parameter in determining the ability of a formation to accept leaching solutions via injection wells. To compare permeabilities of treated and untreated formation samples under controlled laboratory conditions, a permeameter was constructed and accessories assembled. The permeability test apparatus (not shown), includes the confining pressure cell, equipment for supplying a compressive load to the sample, and a means to pressurize the influent leach solution reservoir. the cell is a 5-cm-ID stainless steel cylinder with opposing stainless steel platens (pistons) employed to contain the uranium sand sample and test liquids under compression. The cell geometry allowed use of a low sample-length-to-diameter ration, which prevented arching of sand to the cell walls. A 250-g sample of uranium-bearing sand was loaded into the cell. A constant compressive load (axial) of 30 kg/cm$^2$ was applied to the platens to create a confining stress on the sand. The pressurized leach fluid flowed through stainless steel tubing from the reservoir to the upper platen. From there it flowed through the upper platen, the uranium sand sample, the lower platen, and the pressure relief valve into an effluent leach solution collector. O-rings placed around the platens (near the end contacting th sand sample) and the pressure relief valve made it possible to perform tests with fluid pressures as high as 150 lb/in$^2$ (11 kg/cm$^2$). Fluid pressure drop across the sand sample was measured using electronic transducers, which were placed in the fluid lines entering and leaving the cell. This apparatus enabled uranium to be leached from the sand sample while the permeability was simultaneously measured under a variety of test conditions.

A large plexiglass column 15 cm in diameter and 180 cm long was used as a constant-head permeameter. A constant level of leach fluid was maintained in the column by means of a constant-head overflow return. Fluid level was maintained at 165 cm above the outlet on the bottom end of the column. A 35-kg uranium sand sample was employed in these tests.

ORE SAMPLES

Two of the three materials used in this investigation were uranium-bearing sandstones from Wyoming. The uranium deposits of Wyoming basins were deposited during the Eocene and Paleocene epochs. They are roll-front deposits in Arkosic sandstone and fine-grained siltstone formations which are sandwiched between relatively impermeable shales or claystones below the water table. Typically in a roll-front deposit, uranium has been deposited along an oxidation-reduction front in any of several configurations—crescent-shaped along channel margins, tabular along zones of abrupt permeability changes, and elliptical or dish-shaped within scour pockets. In theory, uranium was leached from a source material and probably transported by the ground water in a dissolved state. As long as the ground water conditions were oxidizing enough to keep uranium oxidized (+6 valence state), no precipitation of uranium would occur. Uranium deposition would occur when the ground water conditions changed from oxidizing to reducing owing to the presence of reducing agents such as $H_2S$, pyrite, or carbon. The uranium in roll-front deposits may occur as finely disseminated mineral particles within the sandstone matrix or as a black coating on individual sand grains.

One uranium ore used in this investigation was from the Bear Creek Mine, 21 miles northeast of Casper in the Powder River Basin of Wyoming. The particle size distribution of the disaggregated Bear Creek ore is shown in Table 1. The sample contained 19 pct minus 200-mesh material, which was primarily calcium, montmorillonite. The plus 200-mesh material was mostly quartz with smaller amounts of feldspar, mica, and calcite. Small amounts of the heavy minerals chlorite, pyrite, magnetite, and clinoziosite were also present. These test samples contained an average of 0.15 pct uranium.

TABLE 1

| Particle size distribution of uranium ore from Bear Creek Mine | |
|---|---|
| Tyler standard testing sieves, mesh per inch | wt pct |
| Plus 20 | 45.55 |
| Minus 20 plus 65 | 26.36 |
| Minus 65 plus 200 | 8.88 |
| Minus 200 | 19.21 |

The second uranium ore was a low-grade one from a pit in the Red Desert of Wyoming. The particle size distribution of disaggregated Red Desert ore is shown in Table 2. The sample contained 13 wt pct minus 200-mesh material, which was primarily calcium montmorillonite with some muscovite. The plus 200-mesh material was mostly quartz and feldspar with smaller amounts of mica and calcite. Small amounts of the heavy minerals chlorite, pyrite, magnetite, and clinozoisite were also present. This ore contained an average of 0.015 pct uranium.

TABLE 2

| Particle size distribution of uranium ore from the Red Desert of Wyoming | |
|---|---|
| Tyler standard testing sieves, mesh per inch | wt pct |
| Plus 20 | 17.35 |
| Minus 20 plus 65 | 51.65 |
| Minus 65 plus 200 | 17.67 |
| Minus 200 | 13.33 |

A clay copper ore from the Lakeshore Mine operated by Noranda Copper Co. near Casa Grande, AZ, was also tested. It had been crushed and screened to minus 4 mesh and contained 13 wt pct minus 200-mesh material. The ore was a porphyry granite made up of quartz, potassium feldspar, albite, muscovite, kaolinite, chlorite, and chrysocolla. Small amounts of martite, goethite, and manganese oxides were also present.

LEACH SOLUTIONS

The common solutions used for in situ uranium leaching are prepared from ammonium carbonate-bicarbonate, sodium carbonate-bicarbonate, carbon dioxide, and sulfuric acid. Oxidizers such as oxygen, hydrogen peroxide, or sodium chloride are employed to convert uranium from its insoluble +4 valence state to its soluble +6 valence state.

The cation associated with the carbonate-bicarbonate anions does not enter into the leaching reactions but can affect ore permeability. As previously pointed out, sodium interacts with the clay to cause swelling and dispersion. Although sodium carbonate-bicarbonate can thus cause permeability loss, its low cost favors its use when clay is not present and would make it an attractive choice for many operations if a method such as the proposed application of clay stabilizers could be developed to prevent the sodium exchange reaction with the clay particles. It was thus a logical choice for an alkaline leaching solution for these experiments. Sulfuric acid is also commonly used if acid-consuming gangue minerals are absent. It was also a logical choice to incorporate into the testing program in order to provide information on the effectiveness of clay stabilizers for acid-leaching operations.

Permeability and leaching tests for evaluating the clay stabilizer were made with either a sodium bicarbonate leach solution near pH 8.5 or a sulfuric acid solution near pH 2. Hydrogen peroxide was the chosen oxidizer in each case.

ORGANIC POLYMER CLAY STABILIZER

The commercial clay stabilizer Cla-Sta-B[3] was developed for use in the oil drilling industry to reduce permeability losses. Its success in that industry led to it being selected for testing under simulate in situ leaching conditions. It is a water-soluble cationic polymer comprised of a long-chain hydrocarbon molecule with attached nitrogen atoms, some of which are quaternary. Polymers of this type often have molecular weights greater that 1,000. Based on oil industry experience, a polymer concentration of 2 pct in water was recommended by the supplier for treating the ore used in permeability-leaching tests.

A number of diluents or carriers are used to make the claystabilizing, polymer more water soluble. Among these are ammonium chloride (2 pct), sodium chloride (8 pct), hydrochloric acid (5 to 15 pct), potassium chloride (4 pct), and methyl alcohol (5 pct). Although ammonium chloride is the most efficient diluent, the environmental problems associated with the ammonium ion dictate that an alternate diluent be selected for in situ leaching applications. Potassium chloride was the diluent employed in these permeability tests.

PERMEABILITY-LEACHING TESTS

Simultaneous permeability and leaching tests on 250-g samples of Bear Creek uranium ore were conducted in the confining pressure cell apparatus using both basic and acidic leach solutions. A 30 kg/cm$^2$ compressive load was applied and maintained on the sample while leach fluid pressure gradient, which was regulated in order to maintain a flow rate of approximately 1 pore volume per hour.

Test with sodium bicarbonate leach solutions were made after pretreatment with three types of solutions: (1) 2 pct clay stabilizer and 4 pct potassium chloride in tapwater, (2) tapwater, and (3) 4 pct potassium chloride in tapwater. Tests with sulfuric acid leach solutions were made after pretreatment with two types of solutions: (1) 2 pct clay stabilizer and 4 pct potassium chloride in tap water and (2) tapwater. In each instance the sample was allowed to retain the pore volume of preflush fluid for ½ hour before leaching with sodium carbonate-bicarbonate or sulfuric acid leach solutions. Effluent samples were taken and permeability was determined at intervals during the tests. The leach solution was not recycled in either case.

Figure 2:
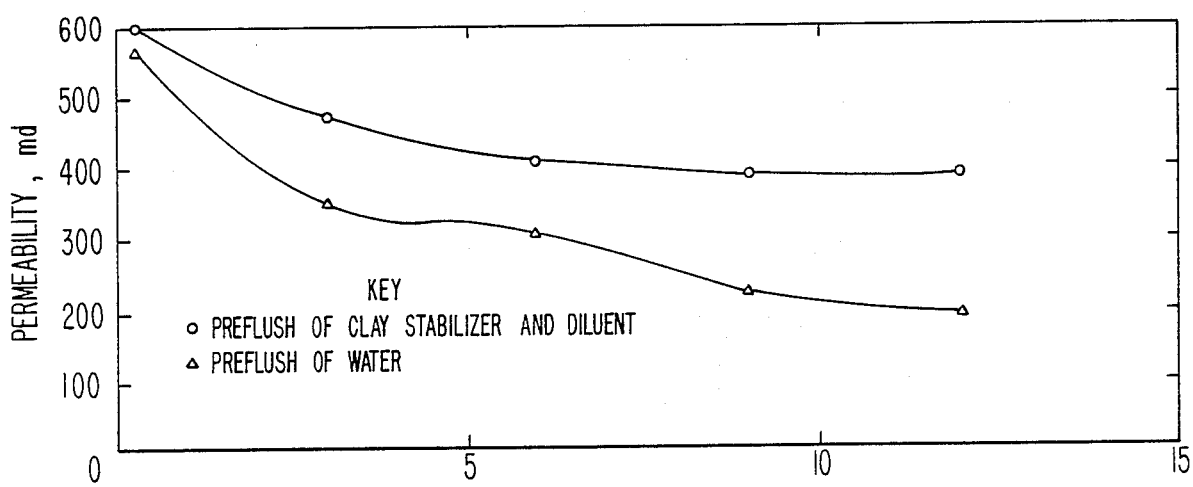
FIG. 2 is a graphical representation of the results of the sulfuric acid leach tests on Bear Creek uranium.

Results of the sodium carbonate-bicarbonate leach test on Bear Creek uranium are shown in FIG. 1. Results of the sulfuric acid leach tests on this ore are shown in FIG. 2. Points on the curves represent the average of two tests with each type of preflush. The results for the sodium carbonate-bicarbonate leaching indicate that, after 12 hours of leaching, the ore pretreated with the clay stabilizer had a permeability about 5 times higher than that of the untreated (tapwater pretreated) ore. These results also confirm that the potassium chloride diluent does not prevent permeability loss but actually causes some additional permeability loss. Thus the increased permeability is owing to the clay stabilizer. The results for the sulfuric acid leaching indicate that, after 12 hours of leaching, the ore pretreated with the clay stabilizer had a permeability about twice that of the untreated (tapwater pretreated) ore. Comparison of the results in FIG. 2 and those in FIG. 1 indicates that the permeability loss is not as great for the sulfuric acid leach as the sodium carbonate-bicarbonate leach. After 12 hours of leaching the permeability is about 380 md for sulfuric-acid-leached ore and only about 150 md for sodium-carbonate-bicarbonate-leached ore.

Figure 3:
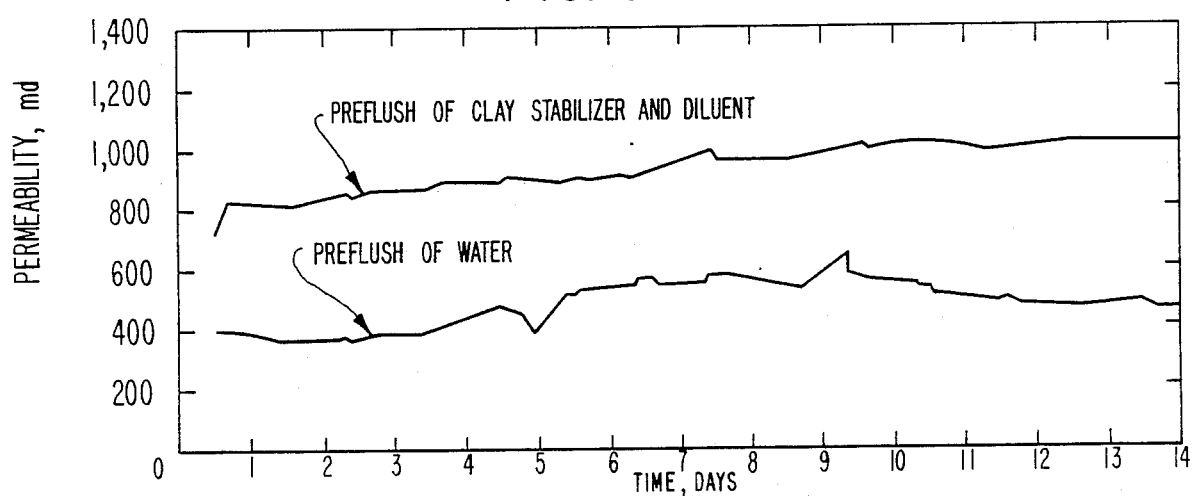
FIG. 3 is a graphical representation of the results of the sulfuric acid solution leach tests on Red Dessert of Wyoming ore.

The Red Desert of Wyoming ore was leached in the large constant-head permeameter using sulfuric acid solutions. One test was made after a preflush of 2 pct clay stabilizer and 4 pct potassium chloride in tapwater, and the other test was made after a preflush of tapwater alone. The preflush solutions were bottom-fed into the column through the outlet and allowed to rise to the constant fluid level 165 cm above the outlet. The sample was allowed to retain the preflush solution for ½ hour before leaching with sulfuric acid solution was begun. Results of these tests are shown in FIG. 3 and indicate that the clay-stabilizer-treated ore had a permeability twice as great as the untreated (tapwater preflush) ore throughout the 14-day test. Because there was no confining pressure, the permeability did not drop with time as it did in the constant-pressure-cell permeameter. These results further confirm that the clay stabilizer could be used to reduce permeability losses when uranium ore is leached with acid.

Figure 4:
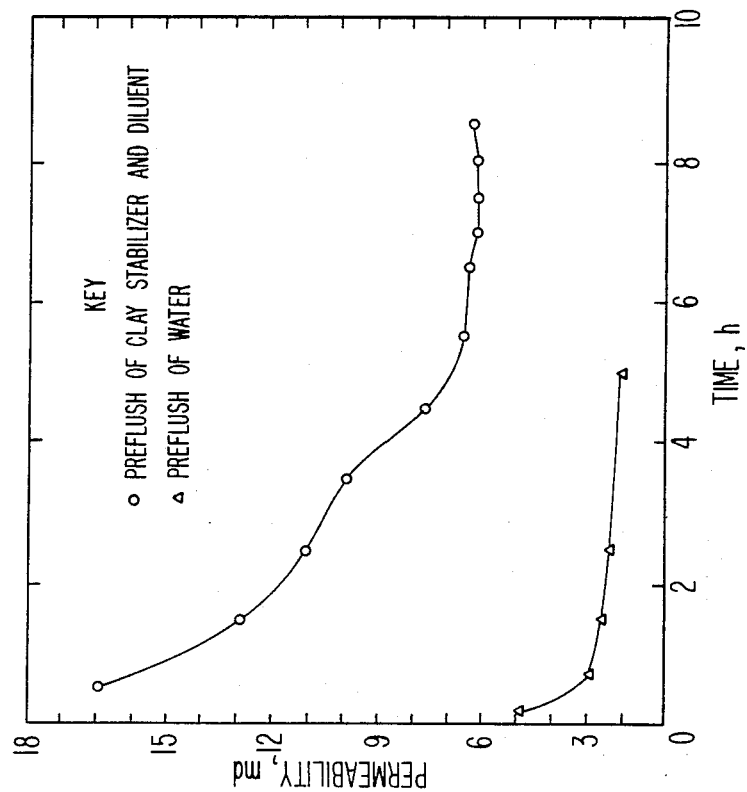
FIG. 4 is a graphical representation of the results of the permeability leaching tests with sulfuric acid on clay copper ore.

Permeability-leaching tests were also made on 250-g samples of the clayey copper ore in the confined-pressure-cell apparatus with a sulfuric acid leach solution of pH 2. These tests were conducted to determine the effect of clay stabilizer pretreatment on clayey-type, metal bearing ore other than those containing uranium. One test was made after a preflush of tapwater alone. The sample was allowed to retain the pore volume of preflush fluid for ½ hour before leaching with sulfuric acid solutions. Results of these tests are shown in FIG. 4 and indicate that after 9 hours the permeability of the clay-stabilizer-treated ore was five times greater than the permeability of the untreated (tapwater-pretreated) ore. The permeability had stabilized at about 1 md at the end of 9 hours. Subsequent large-scale column leaching tests on treated and untreated ore by Noranda have confirmed these results, which indicate that clay stabilizer pretreatment also reduces the permeability loss in acid leaching of a clayey copper ore.

EFFECT OF CLAY STABILIZERS ON URANIUM EXTRACTION

Because of the apparent success of clay stabilizers in reducing permeability losses, the effect of clay stabilizer pretreatment on uranium extraction was studied. The maximum concentration of uranium in the effluent for both alkaline and acidic leaches occurred with the passage of 2 pore volumes of leach solution through the ore. The maximum uranium concentration in the effluent was 400 mg/L for the sodium carbonate-bicarbonate leach and about 500 mg/L for the sulfuric acid leach. After 4 hours of leaching, the uranium content in the effluent had decreased to about 100 me/L with both leach solutions. When untreated Bear Creek ore was leached with sodium carbonate-bicarbonate solution, 44 pct of available uranium was recovered in the first 4 hours. When Bear Creek ore was treated with the clay stabilizer and diluent, 30 pct of the available uranium was extracted in the first 4 hours. It is concluded that the clay stabilizer apparently retards the leaching process and thus may reduce uranium recovery. However, it may be that with time the maximum possible uranium extraction would be attained for both treated and untreated ores. If the stabilizer is used to treat only the ore within a 3-ft. radius of the well bore, where the fluid velocity is highest and where the fines movement would thus be greatest, the reduced recovery in this small ore volume would be more than compensated for by the increased leach flow into the rest of the ore body.

CLAY-SWELLING TEST

To understand the mechanisms by which clay stabilizers reduce permeability losses, the swelling tendencies of sodium montmorillonite clay were analyzed.

Figure 5:
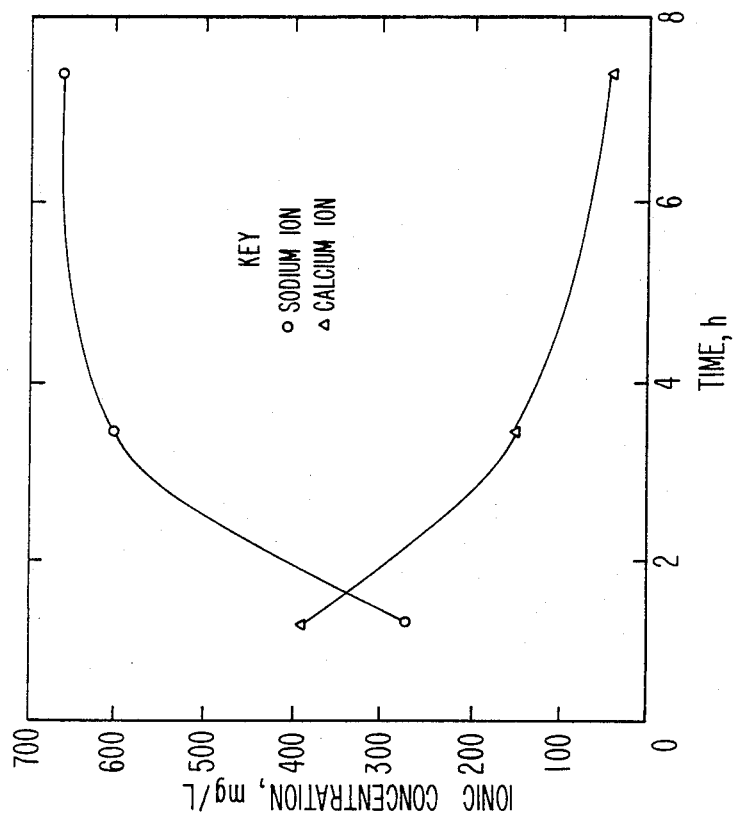
FIG. 5 is a graphical representation of the calcium and sodium concentrations in the effluent as a function of time in the leaching tests using sodium carbonate-bicarbonate solutions.

The predominant clay in the uranium ores tested was a calcium montmorillonite. As described in the Introduction, calcium in the clay lattice can be replaced by sodium ions in the leach solutions. This results in a clay form that is more likely to swell and disperse. An analysis of calcium and sodium in the effluent from tests using sodium carbonate-bicarbonate leaching solutions demonstrated that as leaching proceeds, calcium is in fact displaced by sodium and appears in the effluent solution. FIG. 5 shows the calcium and sodium concentrations in the effluent as a function of time. If there was no exchange of sodium ions for calcium ions in the montmorillonite of the Bear Creek ore, the sodium content of the effluent would be about 650 to 700 mg/L while the calcium content of the effluent would be near zero. However, after 1 hour of leaching with $NaHCO_3$-$NaCO_3$, the calcium content is about 400 mg/L and the sodium content is about 280 mg/L, thereby proving that sodium ions have displaced calcium ions in the clay. As time increases, the clay has become more saturated with sodium ions, fewer calcium ions are displaced, and therefore fewer calcium ions appear in the effluent. The exchange of sodium ions for calcium ions in the clay fraction during sodium carbonate-bicarbonate compared with the drop in permeability for untreated samples leached with sulfuric acid. This has also been reflected in actual in situ leaching experience.

Further evidence of the mechanism by which clay stabilizers reduce permeability losses was provided by a clay-swelling test on a sodium montmorillonite clay.

Results of these tests demonstrate that the clay stabilizer reduced swelling in the clay. Untreated clay has swelled the most, while clay pretreated with stabilizer swelled very little. This characteristic of clay stabilizers is important in retarding clay swelling when sodium montmorillonite is present in the ore.

ZETA POTENTIAL MEASUREMENT

Zeta potential measurements were made on clays subjected to various treatments to provide additional clues regarding the mechanisms responsible for the clay stabilizer's effect on the clay particles.

Electrophoretic mobility of finely divided, solid particles in aqueous suspension can be measured by using a microelectrophoresis instrument. Electrophoretic mobility is the rate of particle motion in an electric field. This motion is brought about by the interaction of the electrostatic charge at the particle-medium interface with an imposed electric field. Electrostatic particle charge is expressed as zeta potential in units of millivolts.

Zeta potential measurements were made on finely divided clay particles that were exposed to three different liquids. Samples of sodium montmorillonite clay each weighing 2 g were blended into 1-L samples of (1) leach solution alone, (2) leach solution with 2 pct ammonium chloride, and (3) leach solution with 2 pct ammonium chloride and 1 pct clay stabilizer. Each of the samples was mixed and sheared for 5 min. in a blender prior to the measurement of zeta potentials of the suspended fine clay particles.

Test results shown in Table 3 indicate the zeta potentials of the fine clay particles treated with the stabilizer are more electropositive that are the zeta potentials of particles treated with simple ions of the leach solution or the leach solution with ammonium chloride. Used in proper concentration, the clay stabilizer is electropositive enough to neutralize the negative charge on fine clay particles and negate the resultant dispersive forces. The means of the zeta potential values are well separated, and the standard deviations indicate that the differences are statistically significant.

TABLE 3

| Sample[1] | Zeta potentials of clay particles measured at pH 7 | | |
|---|---|---|---|
| | 1 | 2 | 3 |
| Mean value of zeta potential, mV | 18.1 | 10.0 | 41.8 |
| Standard Deviation, mV | 3.9 | 5.5 | 2.7 |
| Number of zeta potentials measured | 20 | 20 | 20 |

[1]Clays exposed to leach solution; 1 - no additives; 2- 2 pct $NH_4Cl$; 3 - 2 pct $NH_4Cl$ and 1 pct clay stabilizer.

CONCLUSION

On the basis of the laboratory results of this investigation, it is concluded that pretreatment of clayey ores with a clay stabilizer will reduce permeability losses. Some retardation in metal extraction was observed when a pretreated uranium ore was leached. This possible disadvantage in using clay stabilizers could be minimized if the stabilizer were used to treat only the small volume of ore within the zone of high fluid velocity around the injection well. In this case the reduction in metal extraction would be minimized, while the savings accrued by reducing well maintenance costs and ensuring adequate movement of leach solution into the ore formation would be significant.

The foregoing disclosure and the examples are merely illustrative of the priniciples of this invention and are not to be interpreted in a limiting sense.

What is claimed is:

1. A method of preventing particle dispersion, swelling of clays, and breakup of clay platelets to increase recovery of mineral and metals during chemical leaching of earth material, comprising the steps of:
    forming a treating fluid which comprises cationic polymers, diluents, and including leaching agents; and
    introducing said treating fluid into in-situ subterranean earth material such that swelling action is reduced and thus reducing permeability loss.

2. The method of claim 1 wherein said cationic polymer present in said treating fluid comprises long chain hydrocarbon molecules in the molecular weight range of 1000 and 1,000,000.

3. The method of claim 2 wherein said treating fluid comprises sodium bicarbonate leach solution near pH 8.5 and a hydrogen peroxide oxidizer.

4. The method of claim 3 wherein said treating fluid comprises 8% sodium chloride, 5-15 percent hydrochloric acid, 4 percent potassium chloride and 5 percent methyl alcohol.

5. A method of preventing particle dispersion, swelling of clays, and breakup of clay platelets to increase recovery of minerals and metals during chemical leaching of earth material, comprising the steps of:
    (a) forming a treating fluid comprising;
        a cationic polymer having long chain hydrocarbon molecules in the molecular weight range of 1,000 and 1,000,000;
        a diluent comprising of 8 percent sodium chloride, 5-15 percent hydrochloric acid, 4 percent potassium chloride, and 5 percent methyl alcohol; and
        a sodium bicarbonate leach solution near pH 8.5 and having a hydrogen peroxide oxidizer; and
    (b) introducing said treating fluid into in-situ subterranean earth material such that swelling action is reduced and thus reducing permeability loss.

* * * * *